UNITED STATES PATENT OFFICE.

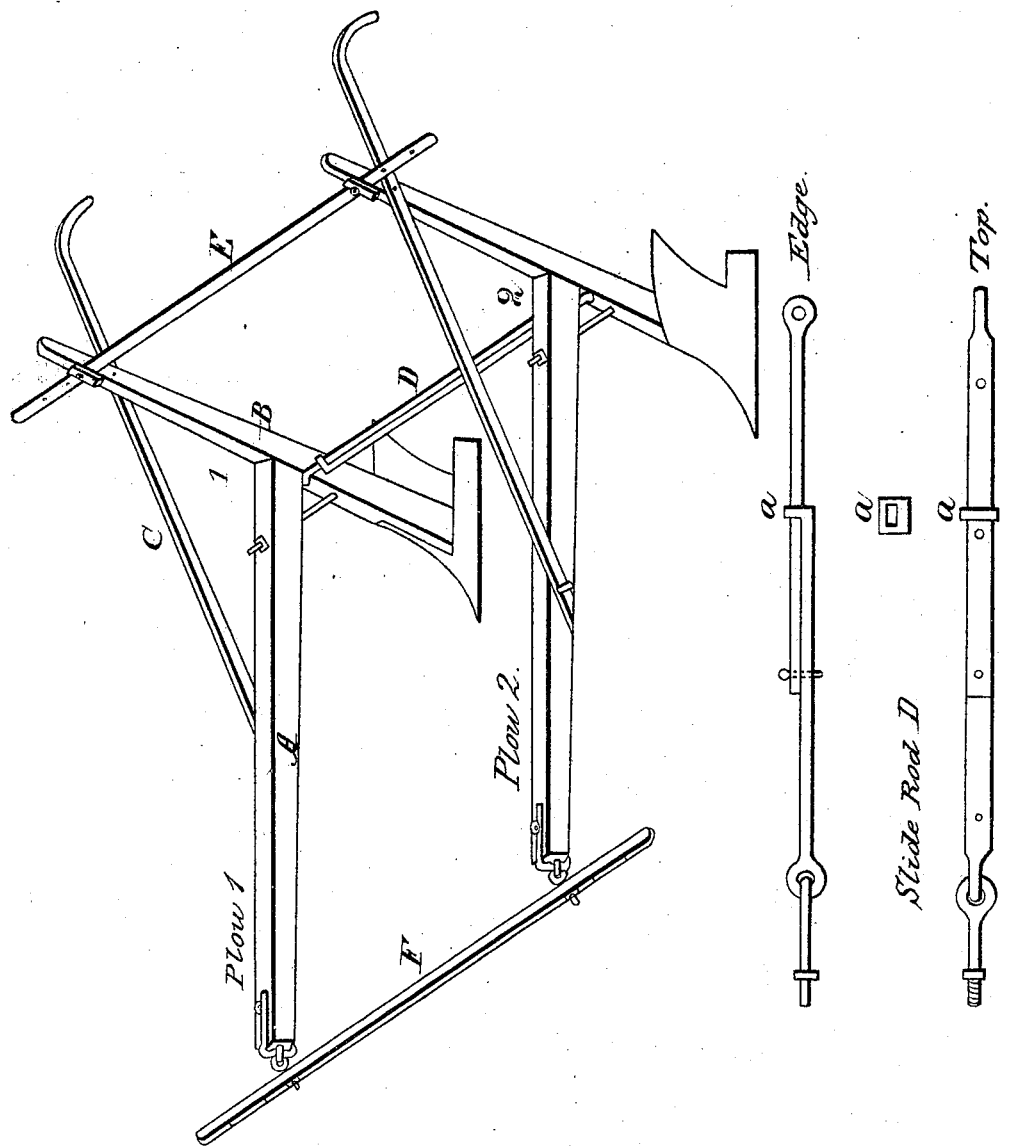

ARNTON SMITH, OF GIRARD, ILLINOIS.

IMPROVEMENT IN PLOWS.

Specification forming part of Letters Patent No. 12,241, dated January 16, 1855.

*To all whom it may concern:*

Be it known that I, ARNTON SMITH, of the county of Macoupin and State of Illinois, have invented a new and useful Improvement on Plows; and I do hereby declare that the following is a full, clear, and exact description of the construction and operation of the same, reference being had to the annexed drawings, making a part of this specification.

The nature of my improvement consists in so constructing them that they shall admit of a free and independent motion of each other by means of the hinged slide rods D, in combination with the bar E and the coupling-rod F, said rod F answering the double purpose of a coupler and a double-tree, and thus dispensing with the weight of a double-tree, (usually employed,) and consequently giving the plowman greater control of the point of his plow than heretofore obtained.

First. I construct two ordinary plows exactly alike, except that the share of one is on the right and throws the dirt to the right, and the share of the other is on the left and throws the dirt to the left, as shown by Figures 1 and 2 in the accompanying drawings. A of Fig. 1 represents the beam of the plow, which is a straight piece of timber mortised into the upright B, as shown in the drawings. B represents the upright into which the beam is mortised, and extends above the beam, as shown in the drawings, and may be longer or shorter to suit convenience. C represents the handle, one end of which is attached to the beam A and extends across the upright B a convenient distance, as shown in the drawings.

Secondly. I then connect the two plows 1 and 2 as thus constructed together, as follows: D represents slide-rods, one end of which is attached to the plow 1 and the other end to the plow 2, as shown in the drawings, which is designed to connect the two plows, and are to be lengthened or shortened at pleasure. E represents a light iron bar, extending from the upright of the plow 1 to the upright of the plow 2, and attached by iron bolts through the iron bar E and through the upright B, so that the same may be lengthened or shortened with the slide-rods D. F represents the double-tree, which is attached to the end of the beam in the ordinary way, and which is also made to lengthen or shorten with the slide-rods D and the iron bar E, also made so as to attach a single-tree to each end of the double-tree or coupling-rod F.

Having thus connected the two plows together, as before described, and attached a horse to each plow, I proceed to plow two furrows at a time. By placing them between two rows of corn I can plow next to each row and throw the dirt either up to or away from the corn; or I can place the two plows on each side of a row of corn and plow each side of the corn-row and throw the dirt away from the corn, or throw the same toward it, and thus hill up the corn, the slide-rods D being so made that the plows 1 and 2 may be changed so as to throw the dirt either to or from the other, the slide-rods D, the bar E, and the double-tree or coupling-rod F being so attached that the plows 1 and 2 may be guided as easily as one plow. They may be managed by one man with ease, and serve a valuable purpose for plowing corn, listing land, or laying off land for planting corn.

I do not claim any of the separate parts of my plow as new, and I am aware that two plows have been united somewhat like mine, but so that both must advance together, and one must, when raised alone, rotate upon and affect the other, while my separate plows may move freely. Therefore

What I claim as my invention, and desire to secure by Letters Patent, is—

The manner of coupling plow 1 with plow 2 by means of hinged slide-rods D, bar E, and rod F for the purpose of allowing each plow a somewhat free and independent motion, and yet bring the plows under the control of one hand of the plowman and in some degree control both plows, as set forth.

ARNTON SMITH.

Witnesses:
W. W. FREEMAN,
A. McKIM DUBOIS.